United States Patent
Narayanan Thangaraj et al.

(10) Patent No.: US 12,119,937 B2
(45) Date of Patent: Oct. 15, 2024

(54) OPEN LOOP HARQ IN WIRELESS SYSTEMS

(71) Applicant: INTERDIGITAL PATENT HOLDINGS, INC., Wilmington, DE (US)

(72) Inventors: Yugeswar Deenoo Narayanan Thangaraj, Chalfont, PA (US); Tuong Duc Hoang, Montreal (CA); Ghyslain Pelletier, Montreal (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 210 days.

(21) Appl. No.: 17/606,967

(22) PCT Filed: Apr. 30, 2020

(86) PCT No.: PCT/US2020/030657
§ 371 (c)(1),
(2) Date: Oct. 27, 2021

(87) PCT Pub. No.: WO2020/223453
PCT Pub. Date: Nov. 5, 2020

(65) Prior Publication Data
US 2022/0239415 A1   Jul. 28, 2022

Related U.S. Application Data

(60) Provisional application No. 62/840,987, filed on Apr. 30, 2019, provisional application No. 62/886,075, filed on Aug. 13, 2019.

(51) Int. Cl.
*H04W 72/00* (2023.01)
*H04L 1/1812* (2023.01)
*H04W 72/23* (2023.01)

(52) U.S. Cl.
CPC ........... *H04L 1/1812* (2013.01); *H04W 72/23* (2023.01)

(58) Field of Classification Search
CPC ..... H04L 1/1812; H04L 1/1896; H04W 72/23
See application file for complete search history.

(56) References Cited

U.S. PATENT DOCUMENTS 11,160,106 B2 * 10/2021 Lee .................. H04W 72/0446
11,265,901 B2      3/2022 Freda et al.
(Continued)

FOREIGN PATENT DOCUMENTS

| CN | 104115437 A | 10/2014 |
| CN | 107580763 A | 1/2018 |

(Continued)

OTHER PUBLICATIONS

3rd Generation Partnership Project (3GPP), R2-1904519, "On Switching Off HARQ for NTN", Ericsson, 3GPP TSG-RAN WG2 #105Bis, Xi'an, China, Apr. 8-12, 2019, 5 pages (Year: 2019).*

(Continued)

*Primary Examiner* — Lan-Huong Truong
(74) *Attorney, Agent, or Firm* — Condo Roccia Koptiw LLP

(57) ABSTRACT

A WTRU may be configured to perform logical channel prioritization. A WTRU may receive an indication (e.g., a mapping) that indicates an association between a first HARQ process ID and a first HARQ processing type and between a second HARQ process ID and a second HARQ processing type. The WTRU may receive an indication (e.g., a mapping) that indicates an association between a first logical channel and the first HARQ processing type and between a second logical channel and the second HARQ processing type. The WTRU may receive an a HARQ process ID indication. The WTRU may determine a HARQ (Continued)

processing type associated with the HARQ process ID. The WTRU may determine a logical channel available for a transmission. The logical channel available to be used may be determined based on the HARQ processing type associated with the HARQ process ID. The WTRU may send the transmission.

12 Claims, 9 Drawing Sheets

(56) References Cited

U.S. PATENT DOCUMENTS

| | | | |
|---|---|---|---|
| 2015/0009930 | A1 | 1/2015 | Rapaport et al. |
| 2018/0049135 | A1 | 2/2018 | Chen et al. |
| 2018/0124802 | A1 | 5/2018 | Yi et al. |
| 2018/0132197 | A1* | 5/2018 | Lin ............... H04W 52/242 |
| 2018/0192434 | A1* | 7/2018 | Lee ............... H04W 28/12 |
| 2019/0116582 | A1 | 4/2019 | Pelletier et al. |
| 2020/0296749 | A1 | 9/2020 | Freda et al. |

FOREIGN PATENT DOCUMENTS

| | | |
|---|---|---|
| CN | 108886803 A | 11/2018 |
| TW | 201737731 A | 10/2017 |
| WO | WO-2014179936 A1 * 11/2014 ........... H04L 1/1812 |
| WO | 2017215749 A1 | 12/2017 |
| WO | 2019005920 A1 | 1/2019 |

OTHER PUBLICATIONS

3rd Generation Partnership Project (3GPP), R2-1903392, "Consideration on HARQ for NTN", ZTE Corporation, Sanechips, 3GPP TSG RAN WG2 Meeting #105bis, Xi'an, China, Apr. 8-12, 2019, 3 pages.

3rd Generation Partnership Project (3GPP), R2-1904519, "On Switching Off HARQ for NTN", Ericsson, 3GPP TSG-RAN WG2 #105Bis, Xi'an, China, Apr. 8-12, 2019, 5 pages.

3rd Generation Partnership Project (3GPP), TS 38.213 V15.3.0, "Technical Specification Group Radio Access Network, NR, Physical Layer Procedures for Control (Release 15)", Sep. 2018, pp. 1-101.

3rd Generation Partnership Project (3GPP), TS 38.321 V15.1.0, "Technical Specification Group Radio Access Network, NR, Medium Access Control (MAC) Protocol Specification (Release 15)", Mar. 2018, pp. 1-67.

3rd Generation Partnership Project (3GPP), TS 38.331 V15.4.0, "Technical Specification Group Radio Access Network, NR, Radio Resource Control (RRC) Protocol Specification (Release 15)", Dec. 2018, pp. 1-474.

3rd Generation Partnership Project (3GPP), R1-1904592, "Views on HARQ issues for NTN", Panasonic, 3GPP TSG RAN WG1 #96bis, Xi'an, China, Apr. 8-12, 2019, pp. 1-3.

* cited by examiner

OPEN LOOP HARQ IN WIRELESS SYSTEMS

CROSS-REFERENCE TO RELATED APPLICATIONS

This application is the National Stage Entry under 35 U.S.C. § 371 of Patent Cooperation Treaty Application No. PCT/US2020/030657, filed Apr. 30, 2020, which claims the benefit of U.S. Provisional Application No. 62/840,987, filed Apr. 30, 2019; and U.S. Provisional Application No. 62/886,075, filed Aug. 13, 2019, the contents of which are incorporated by reference herein.

BACKGROUND

Mobile communications using wireless communication continue to evolve. A fifth generation may be referred to as 5G. A previous (e.g., legacy) generation of mobile communication may be, for example, fourth generation (4G) long term evolution (LTE).

Round trip delay (RTD) for communications in non-terrestrial networks may be much higher than an RTD for communications in terrestrial networks. For example, RTD for a Low Earth Orbit (LEO) satellite at an altitude of approximately 600 km may be on the order of approximately 28 ms. RTD for a Medium Earth Orbit (MEO) satellite at an altitude of approximately 10,000 km may be on the order of approximately 190 ms. RTD for a Geosynchronous Earth Orbit (GEO) satellite may be on the order of approximately 545 ms. Such large RTD times have a variety of impacts on the ability of a wireless transmit/receive unit (WTRU) to maintain support for high data rate services.

SUMMARY

Systems, methods, and instrumentalities are described herein that are associated with logical channel prioritization. A WTRU may be configured to perform logical channel prioritization. A WTRU may receive an indication (e.g., a mapping) that indicates an association between a first hybrid automatic repeat request (HARQ) process identifier (ID) and a first HARQ processing type and between a second HARQ process ID and a second HARQ processing type. The WTRU may receive an indication (e.g., a mapping) that indicates an association between a first logical channel and the first HARQ processing type and between a second logical channel and the second HARQ processing type. The WTRU may receive an uplink (UL) grant that indicates a HARQ process ID. The WTRU may determine a HARQ processing type associated with the HARQ process ID. The WTRU may determine a logical channel available to be used for a transmission. The logical channel available to be used for the transmission may be determined, for example, based on the HARQ processing type associated with the HARQ process ID. The WTRU may send the transmission using the logical channel that is determined to be available.

The WTRU may (e.g., for the determination of the logical channel available for use based on the HARQ processing type associated with the HARQ process ID) determine that the first logical channel is available for use for the transmission, for example, if the HARQ process ID is associated with the first HARQ processing type. The WTRU may (e.g., for the determination of the logical channel available for use based on the HARQ processing type associated with the HARQ process ID) determine that the second logical channel is available for use for the transmission, for example, if the HARQ process ID is associated with the second HARQ processing type. The WTRU may (e.g., for the determination of the logical channel available for use based on the HARQ processing type associated with the HARQ process ID) determine that the first logical channel is not available for use for the transmission, for example, if the HARQ process ID is not associated with the first HARQ processing type. The WTRU may (e.g., for the determination of the logical channel available for use based on the HARQ processing type associated with the HARQ process ID) determine that the second logical channel is not available for use for the transmission, for example, if the HARQ process ID is not associated with the second HARQ processing type.

In examples, the first HARQ processing type may be a closed loop HARQ processing type and the second HARQ processing type may be an open loop HARQ processing type.

Systems, methods, and instrumentalities are described herein that are associated with logical channel prioritization. A WTRU may be configured to perform logical channel prioritization. A WTRU may receive a mapping that indicates an association between a first hybrid automatic repeat request (HARQ) process identifier (ID) and a first HARQ processing type and between a second HARQ process ID and a second HARQ processing type. The WTRU may receive a mapping that indicates an association between a first logical channel and the first HARQ processing type and between a second logical channel and the second HARQ processing type. The WTRU may receive an uplink (UL) grant that indicates a HARQ process ID. The WTRU may determine a HARQ processing type associated with the HARQ process ID. The WTRU may determine a logical channel restriction that restricts a logical channel from being used for a transmission. The logical channel restriction may be determined, for example, based on the HARQ processing type associated with the HARQ process ID.

The WTRU may (e.g., for the determination of the logical channel restriction based on the HARQ processing type associated with the HARQ process ID) restrict the first logical channel from being used for the transmission, for example, if the HARQ process ID is associated with the first HARQ processing type and/or restrict the second logical channel from being used for the transmission, for example, if the HARQ process ID is associated with the second HARQ processing type.

The first HARQ processing type may be, for example, a closed loop HARQ processing type and the second HARQ processing type may be, for example, an open loop HARQ processing type. The first HARQ processing type may be associated with a first power parameter and the second HARQ processing type may be associated with a second power parameter. The transmission may be, for example, a scheduling request (SR). The WTRU may send the transmission (e.g., an SR) using (e.g., on) a logical channel that is unrestricted for use. The transmission may be associated with a power parameter. The power parameter may be the first power parameter or the second power parameter. The first power parameter may be, for example, a first power offset, a first fractional power value, a first transmit power command (TPC) command, or a first target power. The second power parameter may be, for example, a second power offset, a second fractional power value, a second TPC command, or a second target power.

Systems, methods, and instrumentalities are described herein for determining and applying various types of hybrid automatic request (HARQ) processing to downlink and/or uplink processes. A WTRU may determine a first HARQ processing type (HPT) associated with a first HARQ process and a second HARQ processing type associated with a second HARQ process. The first HARQ processing type and/or the second HARQ processing type may be determined, for example, based on a semi-static configuration and/or received dynamic signaling. For example, the first HARQ processing type and/or the second HARQ processing type may be preconfigured.

A WTRU may apply the first HARQ processing type to the first HARQ process associated with a first transmission, and the second HARQ processing type to the second HARQ process associated with a second transmission. The first HARQ processing type or the second HARQ processing type may be, for example, a closed-loop HARQ processing, an open-loop HARQ processing, or a stateless HARQ processing. The first HARQ processing type and/or the second HARQ processing type may be applied, for example, based on a type of scheduling information, e.g., received from a network.

The first HARQ processing type or the second HARQ processing type may be applied to the first transmission, for example, for a duration of an RRC connection or a duration of an RRC configuration. The first HARQ processing type and/or the second HARQ processing type may be specific to a serving cell. The WTRU may receive a configuration regarding the first HARQ processing type and/or the second HARQ processing type, for example, via system information. The first HARQ processing type or the second HARQ processing type may be for one or more HARQ process identities.

A WTRU may determine HARQ behavior associated with one or more configured grants based on a HARQ configuration. The WTRU may determine HARQ behavior associated with one or more configured grants, for example, based on a HARQ configuration for transmissions associated with dynamic (e.g., non-configured) grants.

DETAILED DESCRIPTION

Figure 1A:
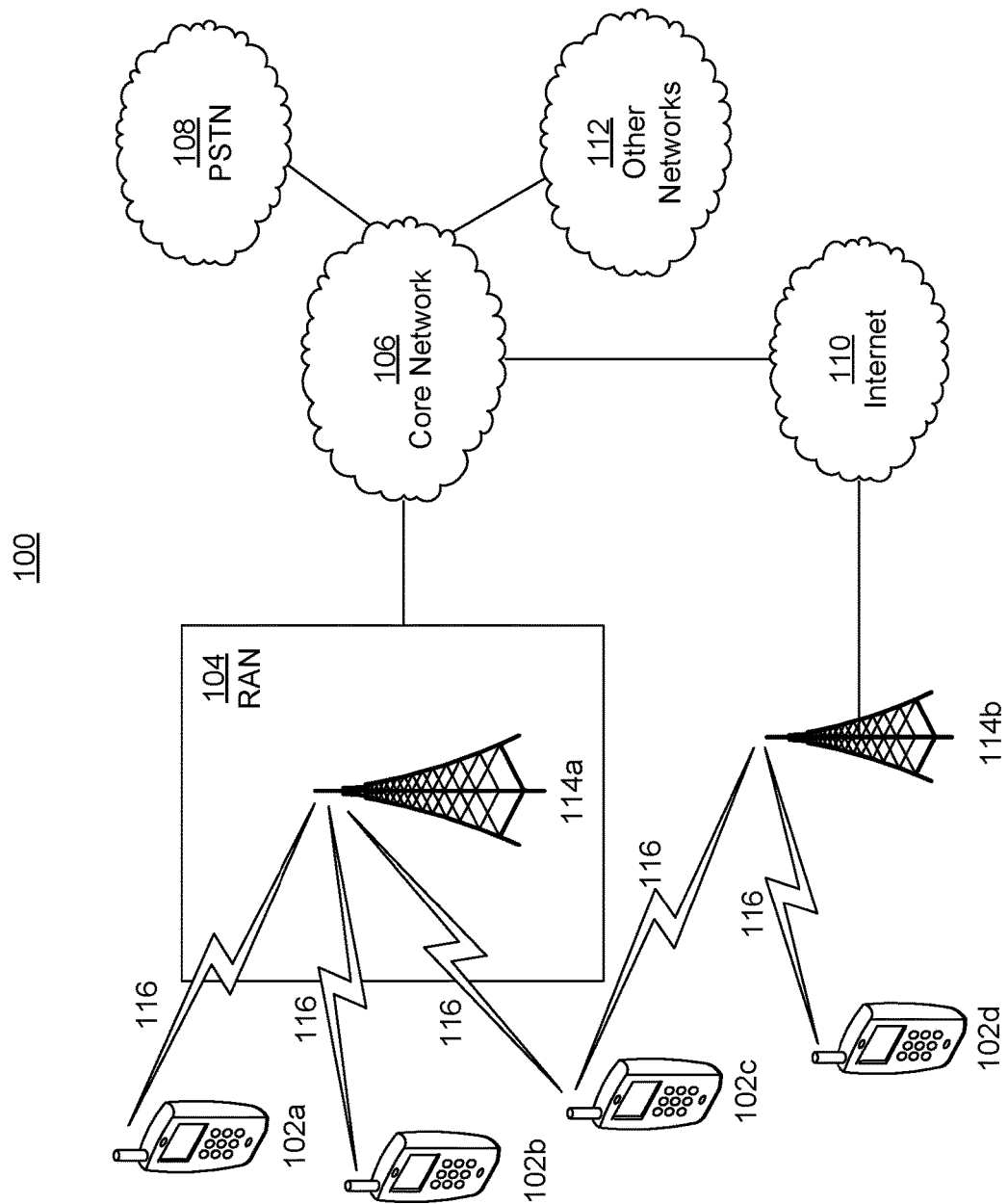
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
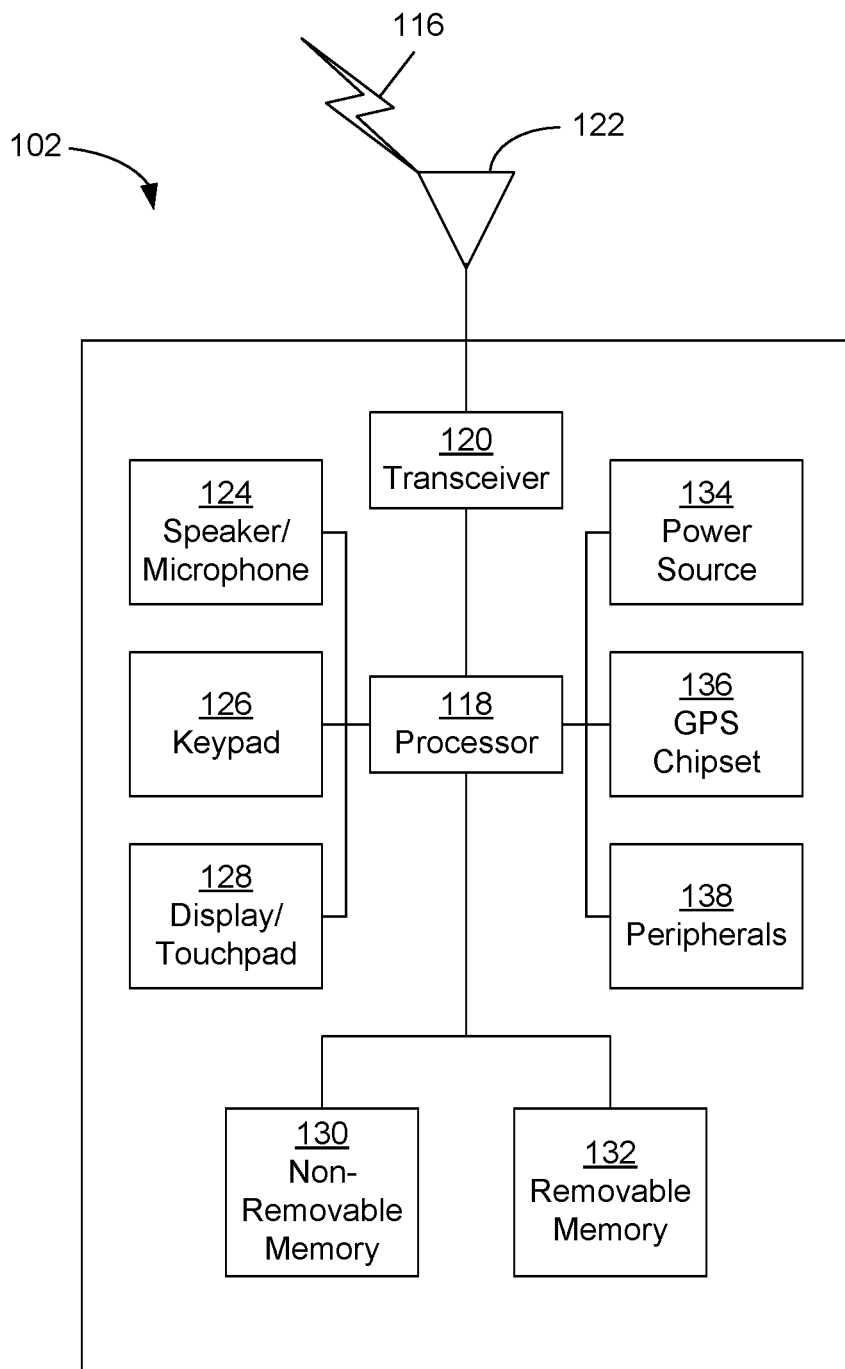
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
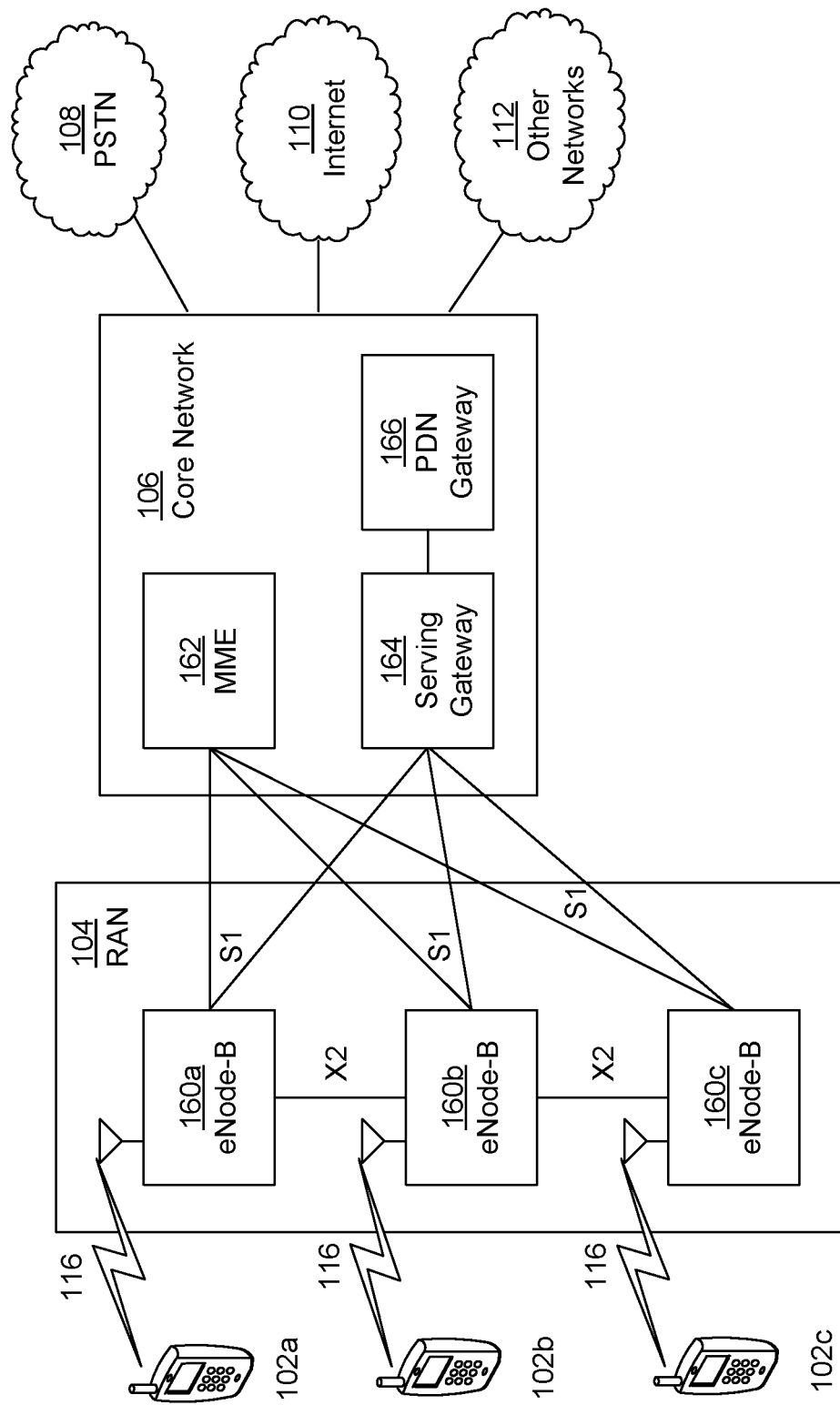
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
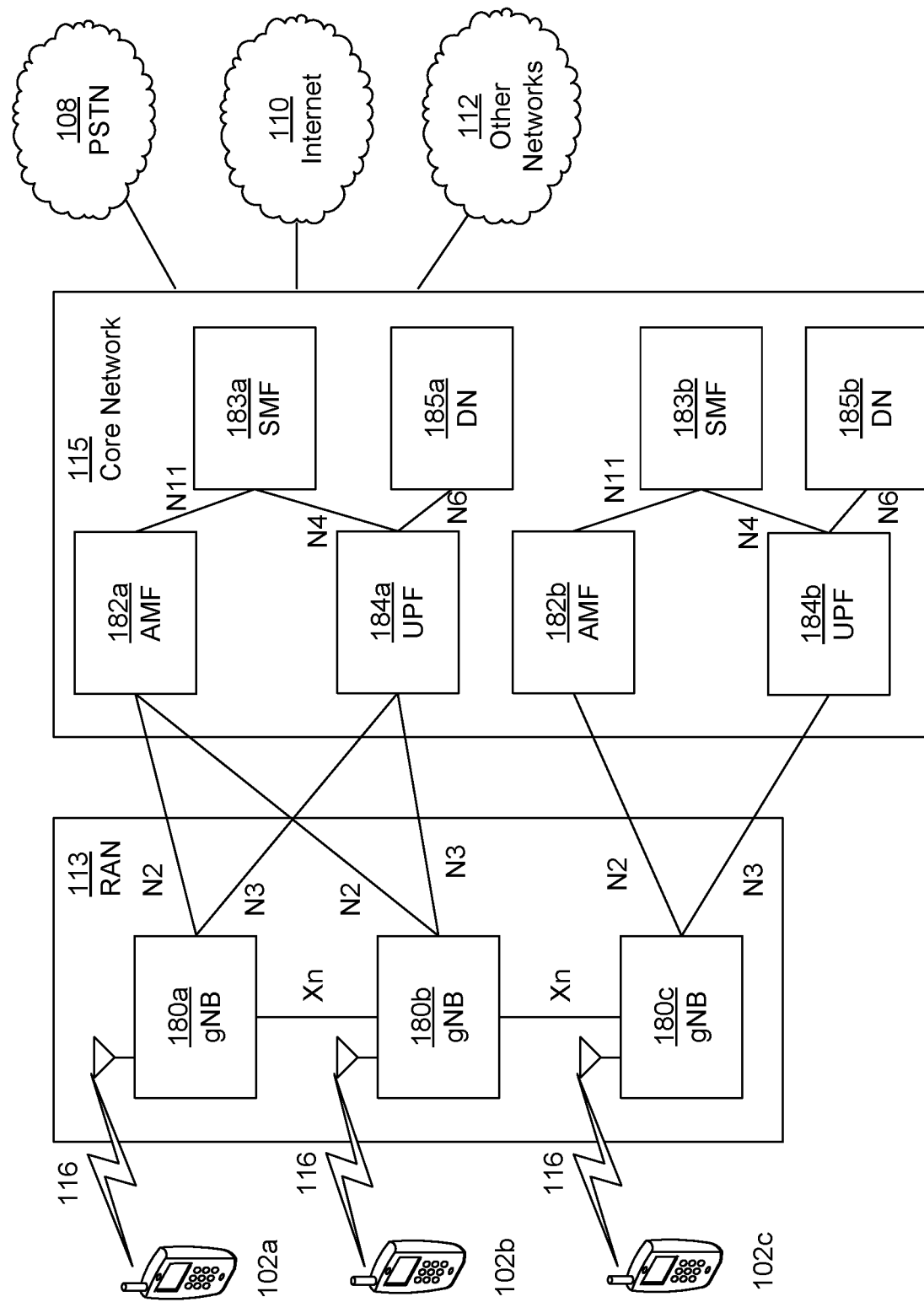
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Hybrid automatic repeat request (HARQ) operation at a WTRU may be modified, for example, due to larger RTD times for non-terrestrial networks. For example, a soft buffer size at a WTRU may be increased for large RTD times. A HARQ procedure may be modified, for example, to address cases of high RTDs.

A non-terrestrial Network (NTN) may be utilized, for example, to provide 5G services in unserved areas that may not be covered by terrestrial 5G networks. Unserved areas may include, for example, isolated remote areas, rural areas, oceans, etc. NTN may be used to upgrade the performance of terrestrial networks in underserved areas (e.g., in a cost efficient manner). NTN may be used to reinforce 5G service reliability, for example, by providing service availability and scalability for 5G deployments.

The term "network" may refer to one or more gNBs, which may be associated with one or more Transmission/Reception Points (TRPs) and/or any other node in a radio access network (RAN).

Figure 2:
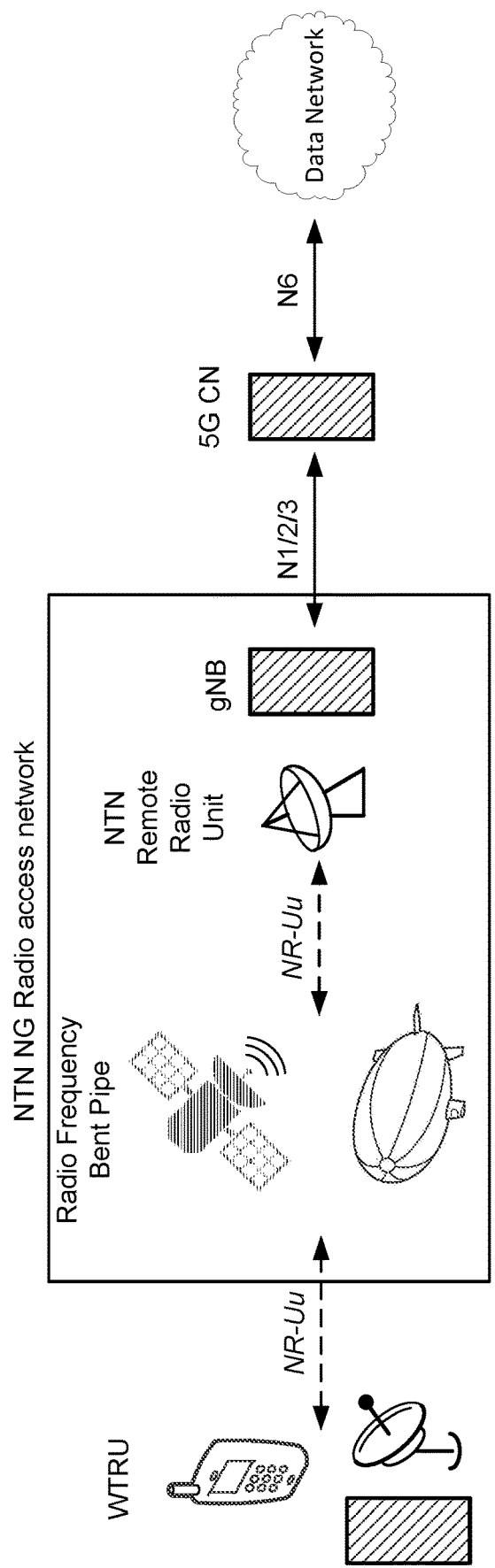
FIG. 2 illustrates an exemplary next generation radio access network (NG-RAN) architecture in a non-terrestrial network with a bent pipe payload.
Figure 3:
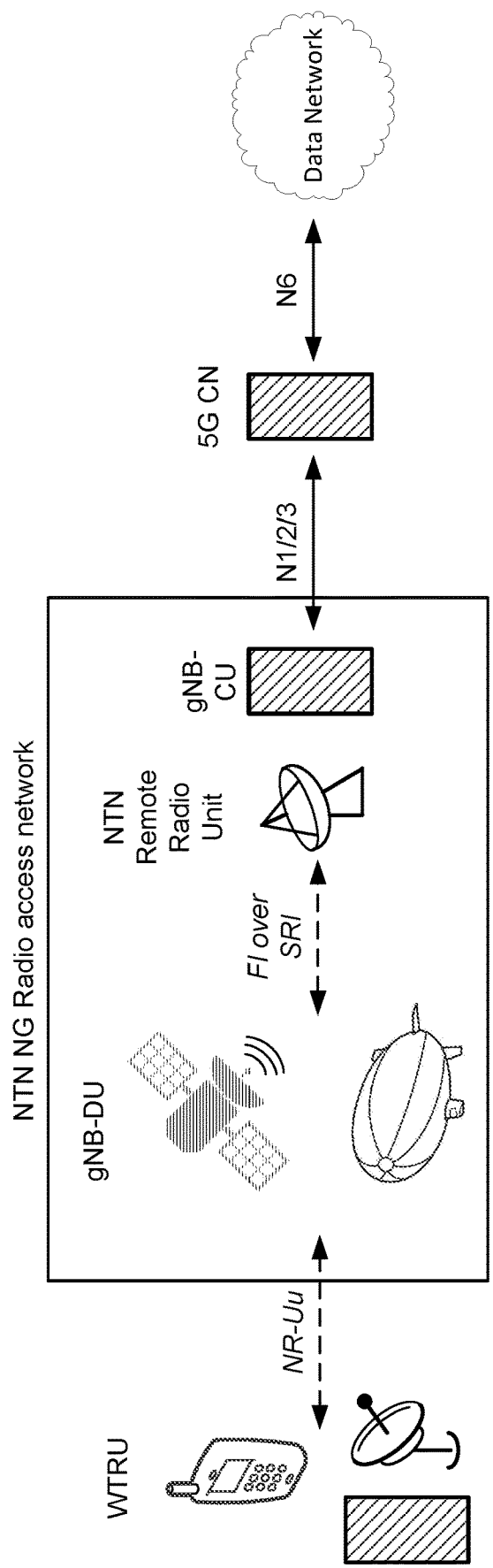
FIG. 3 illustrates an exemplary NG-RAN architecture in a non-terrestrial network with a gNB-DU processed payload.
Figure 4:
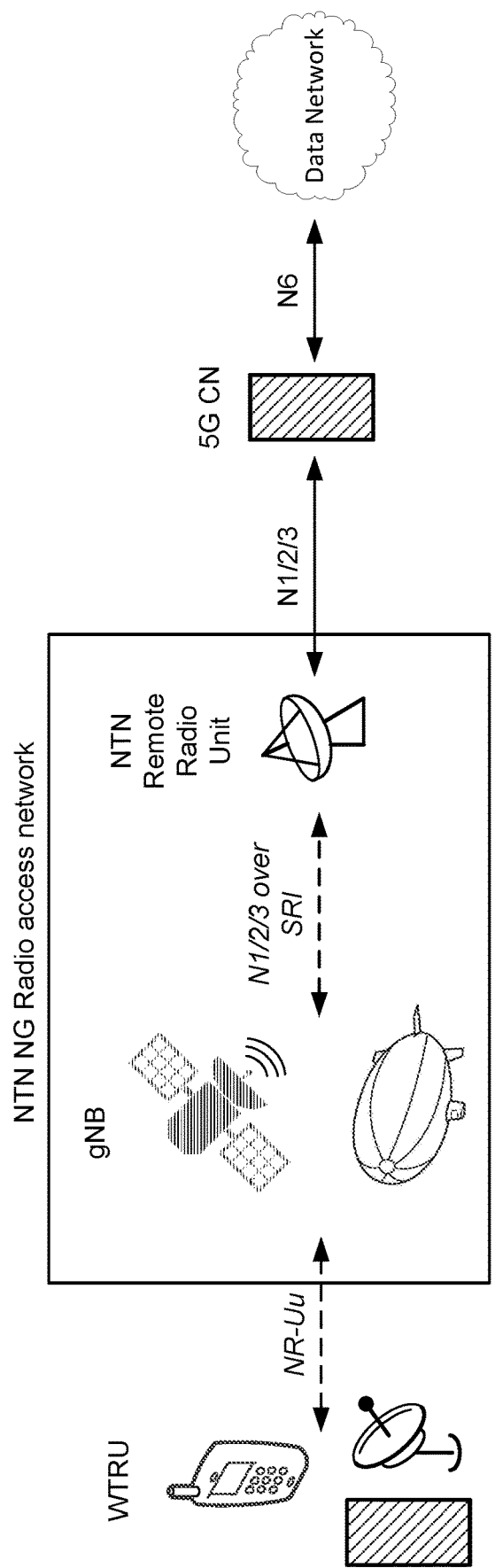
FIG. 4 illustrates an exemplary NG-RAN architecture in a non-terrestrial network with a gNB processed payload.

Various NTN architectures may be based on a RAN functional split between a ground unit and a satellite, e.g., as illustrated by examples shown in FIG. 2-4.

FIG. 2 illustrates an example of a next generation radio access network (NG-RAN) architecture in a non-terrestrial network with a bent pipe payload. In examples, an NG-RAN may comprise a radio access network that connects to a 5G core network (CN). For example (e.g., as shown in FIG. 2), a WTRU may communicate with a data network via an NG-RAN (e.g., comprising a transponder, such as an RF bent pipe transponder, an NTN remote radio unit (RRU), and a gNB) coupled to a 5G CN (e.g. via an N1/2/3 interface).

FIG. 3 illustrates an example of an NG-RAN architecture in a non-terrestrial network with a gNB distributed unit (gNB-DU) processed payload. As illustrated by example in FIG. 3), a gnB-DU may be connected to a gnB-CU, e.g., via an F1 interface using a satellite radio interface (SRI). For example (e.g., as shown in FIG. 3), a WTRU may communicate with a data network via an NG-RAN (e.g., comprising a gNB-DU, an NTN RRU, and a gNB-CU) coupled to a 5G CN (e.g. via an N1/2/3 interface).

FIG. 4 illustrates an example of an NG-RAN architecture in a non-terrestrial network with a gNB processed payload. As illustrated by example in FIG. 4, a gNB may be connected to a 5G CN via an N1/2/3 interface (e.g. over SRI). For example (e.g., as shown in FIG. 4), a WTRU may communicate with a data network via an NG-RAN (e.g., comprising a gNB and an NTN RRU) coupled to a 5G CN (e.g. via an N1/2/3 interface).

A WTRU may be configured (e.g., in NR) to utilize one or more Hybrid Automatic Repeat Request (HARQ) protocols, for example, to achieve robustness against transmission errors. Robustness may be achieved, for example, by (e.g., enabling) soft combining and fast retransmissions. Hybrid ARQ may utilize multiple stop and wait protocols to allow continuous transmission of data. A WTRU MAC may include a HARQ entity for a (e.g., each) serving cell. A WTRU may maintain a number of parallel HARQ processes. A (e.g., each) HARQ process may be associated with a HARQ process identifier. A (e.g., each) HARQ process may be associated with a HARQ buffer. An asynchronous HARQ protocol may be utilized in a downlink direction and an uplink direction. A HARQ process identity associated with a downlink transmission or an uplink transmission may be signaled (e.g., explicitly signaled), for example, as part of the downlink control information (DCI).

A round trip delay (RTD) for communications in in non-terrestrial networks (NTNs) may be higher than an RTD for communications in terrestrial networks. For example, an RTD for a low earth orbit (LEO) satellite at an altitude of approximately 600 km may be of the order of approximately 28 ms. An RTD for medium earth orbit (MEO) at an altitude of approximately 10,000 km may be of the order of approximately 190 ms. An RTD for geosynchronous earth orbit (GEO) may be of the order of approximately 545 ms. The large RTD times may have a direct impact on the number of HARQ processes that a WTRU may maintain to support high data rate services. A soft buffer size at a WTRU may increase, for example, with the number of HARQ processes.

In examples, the HARQ function may be disabled for non-terrestrial communications. A WTRU may (e.g., with HARQ disabled) rely on higher layer retransmissions. However, disabling a HARQ function may lead to decreased reliability or increased latency to achieve a desired reliability. For example, voice services using radio link monitoring-unacknowledged mode (RLM-UM) may suffer from a lack of reliability, e.g., if HARQ is disabled. Services with infrequent data transfers may benefit from HARQ operation and may not be constrained by large propagation delays for NTN communications.

A WTRU may transmit a radio resource control (RRC) message, for example, on signaling radio bearer 0 (SRB0). An RRC message may be transmitted, for example, prior to receiving a full RRC configuration or before establishment of signaling radio bearer 1 (SRB1). In examples, a WTRU may (e.g., during an initial access) send an MSG3 (e.g., an RRCSetupRequest message) using, for example, radio link control (RLC) transparent mode. The WTRU may receive an MSG4 (e.g., an RRCSetup message) from a network, e.g., to establish SRB1. HARQ may be utilized, for example, to ensure reliability of communication, e.g., during (e.g., legacy) MSG3 and/or MSG4 transmission. Reliability of an initial signaling exchange may be compromised, for example, if HARQ is disabled. One or more RRC procedures may involve transmission of a (e.g., single) RLC protocol data unit (PDU). Using an RLC level status report (e.g., in the absence of HARQ) to recover lost PDUs may add significant latency to an RRC procedure.

Systems and methods are described herein for providing open loop HARQ. A WTRU may (e.g., be configured to) apply a first set of HARQ functions and/or a first HARQ behavior for a first set of HARQ processes, and a second behavior for a second set of processes. A HARQ configuration may be for downlink HARQ processes, uplink processes, or both downlink and uplink processes.

In examples, a HARQ behavior may be modeled and/or configured as a type of HARQ process. A type of and/or behavior for HARQ processing may include, for example, one or more of closed-loop HARQ processing, open-loop HARQ processing, and/or stateless HARQ processing. Soft-combining of various transmissions may be applicable, for example, for closed-loop HARQ processing. Transmission and/or reception of HARQ feedback (e.g., HARQ ACK/NACK) may be applicable, for example, for closed-loop HARQ processing. Soft-combining of various transmissions may be applicable, for example, for open-loop HARQ processing. Transmission/reception of HARQ feedback may not be applicable, for example, for open-loop HARQ processing. Soft-combining and transmission/reception of HARQ feedback may not be applicable, for example, for stateless HARQ processing.

A WTRU may determine the type of HARQ processing that may be associated with a given HARQ process based on, for example, a semi-static configuration and/or dynamic signaling. In examples, a WTRU may apply a preconfigured HARQ process type (HPT) to a (e.g., each) transmission and/or reception, for example, for a duration of an RRC connection or a duration of an RRC configuration. In examples (e.g., of using semi-static configuration), a WTRU may apply a preconfigured HARQ process type specific to a serving cell. For example, the type of HARQ process to be applied and/or the HARQ process may be indicated (e.g., in system information) and/or implicitly determined (e.g., as a function of a serving frequency and/or a cell identity).

Dynamic methods (e.g., used to determine a HARQ process type) may include one or more of the following. In examples of a dynamic method, a WTRU may apply a specific HARQ process type to a subset of configured HARQ process(es). A WTRU may assume open loop HARQ operation for one or more predefined HARQ process identities (e.g., HARQ process ID (PID) 0 or the like). A WTRU may be configured (e.g., explicitly configured) with a list of HARQ process identifiers (IDs), for which an open loop HARQ process type may be applied. A configuration may be provided, for example, via an RRC message.

In examples of a dynamic method, a WTRU may apply a preconfigured type of HARQ processing to specific transmissions (e.g., downlink, uplink, or both downlink and uplink transmissions). For example, the type of HARQ processing applied may be based on dynamic indications in downlink control information (DCI) or assignment and/or grant information (e.g., dynamic or configured). A WTRU may determine the type of HARQ processing based on, for example, the type of DCI received for a transmission. For example, a WTRU may apply a first HARQ processing if the WTRU receives a first DCI type or format and a second HARQ processing otherwise (e.g., and/or if the WTRU receives a second DCI type or format).

In examples of a dynamic method, a WTRU may apply a preconfigured type of HARQ processing to specific transmissions (e.g., downlink, uplink, or both downlink and uplink transmissions). For example, the type of HARQ processing applied may be based on the type of scheduling information. In examples, a WTRU may apply a first processing to a HARQ process associated with a semi-statically configured assignment and/or grant, and may apply a second processing for dynamically scheduled transmissions. For example, a WTRU may apply a first processing to a HARQ process associated with a semi-statically configured assignment of a first type (e.g., semi-persistent scheduling (SPS) Type 0), and may apply a second processing otherwise.

In examples, a WTRU may determine the type of HARQ processing to be applied to a transmission based on, for example, a HARQ process identity that may be included in a UL grant. In an (e.g. additional or alternative) example, a WTRU may determine the type of HARQ processing to apply (e.g., for a reception) based on, for example, HARQ process identity that may be included in the downlink control information (DCI) carrying a downlink (DL) assignment.

In examples, a WTRU may (e.g., be configured to) apply a first HARQ processing for HARQ processes scheduled for HARQ PID=x, where x may be, for example, zero (PID=0), which may represent closed-loop HARQ processing. A WTRU may (e.g., be configured to) apply a second processing otherwise (e.g., open-loop HARQ processing). The WTRU MAC layer may instruct the PHY layer to generate HARQ feedback for a DL transmission (e.g., only) for HARQ PID=x. The WTRU MAC layer may (e.g., based on HARQ feedback for HARQ PID=x) assume (e.g., implicitly assume) a HARQ ACK for UL transmissions other than for HARQ PID=x, so that, for example, a HARQ process may be suspended and/or the HARQ buffer may be cleared after the transmission. A WTRU may use a different (e.g., legacy) procedure (e.g., NR R15 HARQ procedure, LTE R8 HARQ procedure, etc.) to process HARQ feedback, e.g., for other PID values. A WTRU may be configured, for example, so that a UL HARQ process (e.g., configured for open-loop HARQ processing or for stateless HARQ processing) may not reach a maximum number of HARQ retransmissions, and/or may not bigger a radio link failure (RLF). A WTRU may be configured, for example, to not count and/or update a HARQ retransmission counter. For example, a WTRU may (e.g., be configured to) toggle the New Data Indicator (NDI) for a HARQ process that corresponds to a HARQ PID configured for stateless HARQ processing (e.g., HARQ PID !=0 in the previous example). A WTRU may (e.g., otherwise) perform a different (e.g., legacy) determination for toggling the NDI (e.g., NR R15 procedure for toggling NDI, LTE R8 procedure for toggling NDI, etc.).

A WTRU may (e.g., be configured to) transmit an indication of long term HARQ performance to a network entity, for example, in the absence of HARQ feedback. An indication may be utilized by a network entity, for example, to adjust the number of blind retransmissions. An indication may be communicated, for example, via an RLC status report. Long term HARQ feedback may be triggered, for example, based on a number of cyclic redundancy check (CRC) failures within a time period. An RLC status report may be triggered, for example, based on a number of CRC failures within a time period. The triggered RLC status report may or may not include the long term HARQ feedback.

A WTRU may be configured with discontinuous reception (DRX). DRX behavior may be based on (e.g., may be a function of) HARQ processing. In examples, a WTRU may (e.g., be configured to) handle one or more timers associated with DRX based on, for example, a HARQ process type associated with a DL assignment and/or a UL grant.

A WTRU may perform various actions (e.g., as described herein), for example, if (e.g., when) DRX is configured. A MAC entity of a WTRU (e.g., in Active Time state) may monitor a physical downlink control channel (PDCCH), for example, to determine whether the PDCCH indicates a UL or a DL transmission. A WTRU may determine whether a corresponding HARQ process type is open or closed loop.

A WTRU may (e.g., for a DL transmission indicated by the PDCCH with a corresponding closed loop HARQ process type), for example, start the drx-HARQ-RTT-TimerDL timer for the corresponding HARQ process in the first symbol (e.g., after the end of the corresponding transmission carrying the DL HARQ feedback) and stop the drx-RetransmissionTimerDL timer for the corresponding HARQ process. A WTRU may (e.g., for a DL transmission indicated by the PDCCH with a corresponding open loop HARQ process type), for example, start or restart the drx-RetransmissionTimerDL timer for the corresponding HARQ process.

A WTRU may (e.g., for a UL transmission indicated by the PDCCH with a corresponding closed loop HARQ process type), for example, start the drx-HARQ-RTT-TimerUL timer for the corresponding HARQ process in the first symbol (e.g., after the end of the first repetition of the corresponding PUSCH transmission) and stop the drx-RetransmissionTimerUL timer for the corresponding HARQ process. A WTRU may (e.g., for a UL transmission indicated by the PDCCH and a corresponding open loop HARQ process type), for example, start or restart drx-RetransmissionTimerUL timer for the corresponding HARQ process.

A WTRU may (e.g., be configured to) perform DRX adaptation, for example to provide or account for propagation delay. DRX adaptation may be performed (e.g., autonomously) by a WTRU and/or may be based on configurations and/or commands received from a network entity. In examples, DRX may be utilized to provide power saving at the WTRU, for example, based on (e.g., as a function of) data transmission/reception activity. Non-terrestrial networks may experience large propagation delays (e.g., 95 ms for LEO and 272 ms for GEO). A WTRU may not (e.g., be required to) monitor PDCCH, for example, if (e.g., when) not in active time (e.g., during inactive time). Active time may include a time when, for example, one or more of the following timers are running: drx-onDurationTimer; drx-InactivityTimer; drx-RetransmissionTimerDL; drx-RetransmissionTimerUL; or ra-ContentionResolutionTimer. In examples, an active time may include a time when, for example, a scheduling request is pending. Unnecessary power consumption may occur, for example, if a WTRU stays in active time while waiting for a response from a network with a significant propagation delay, such as an NTN.

A WTRU may (e.g., be configured to) apply a discontinuous reception (DRX), for example, based on propagation delay. Application of DRX may be used to attempt to maximize sleep time without a large negative affect on performance (e.g., latency, reliability, etc.). In examples, a WTRU may enter into sleep mode for a preconfigured duration of time upon completion of a UL transmission for which a response is expected, for example, if there are no other DL receptions and/or UL transmissions expected before the expected response for the UL transmission. In examples, a WTRU may (e.g., be configured to) sleep (e.g., instead of continuously monitoring PDCCH), for example, while waiting for a response from a network entity. In an (additional and/or alternative) example, a WTRU may apply the DRX based on propagation delay for UL transmissions, including, but not limited to, transmission of a preamble, an MSG3, a scheduling request, etc. In examples, a WTRU may (e.g., be configured to) start a timer (e.g., a propagation delay timer) upon a UL transmission. In examples, a WTRU may not (e.g., be required to) monitor PDCCH, for example, if a propagation delay timer is running. In examples, a WTRU may not (e.g., be required to) monitor PDCCH, for example, if a propagation delay timer is running and one or more of the following timers are not running: drx-onDurationTimer; drx-InactivityTimer; drx-RetransmissionTimerDL; or drx-RetransmissionTimerUL. In examples, a WTRU may not (e.g., be required to) monitor PDCCH, for example, if a propagation delay timer is running and the ra-ContentionResolutionTimer is running. In examples, a WTRU may not (e.g., be required to) monitor PDCCH, for example, if a propagation delay timer is running and a response to a scheduling request is pending. A WTRU may (e.g., be configured to) wake up and monitor PDCCH, for example, upon expiry of a propagation delay timer.

Figure 5:
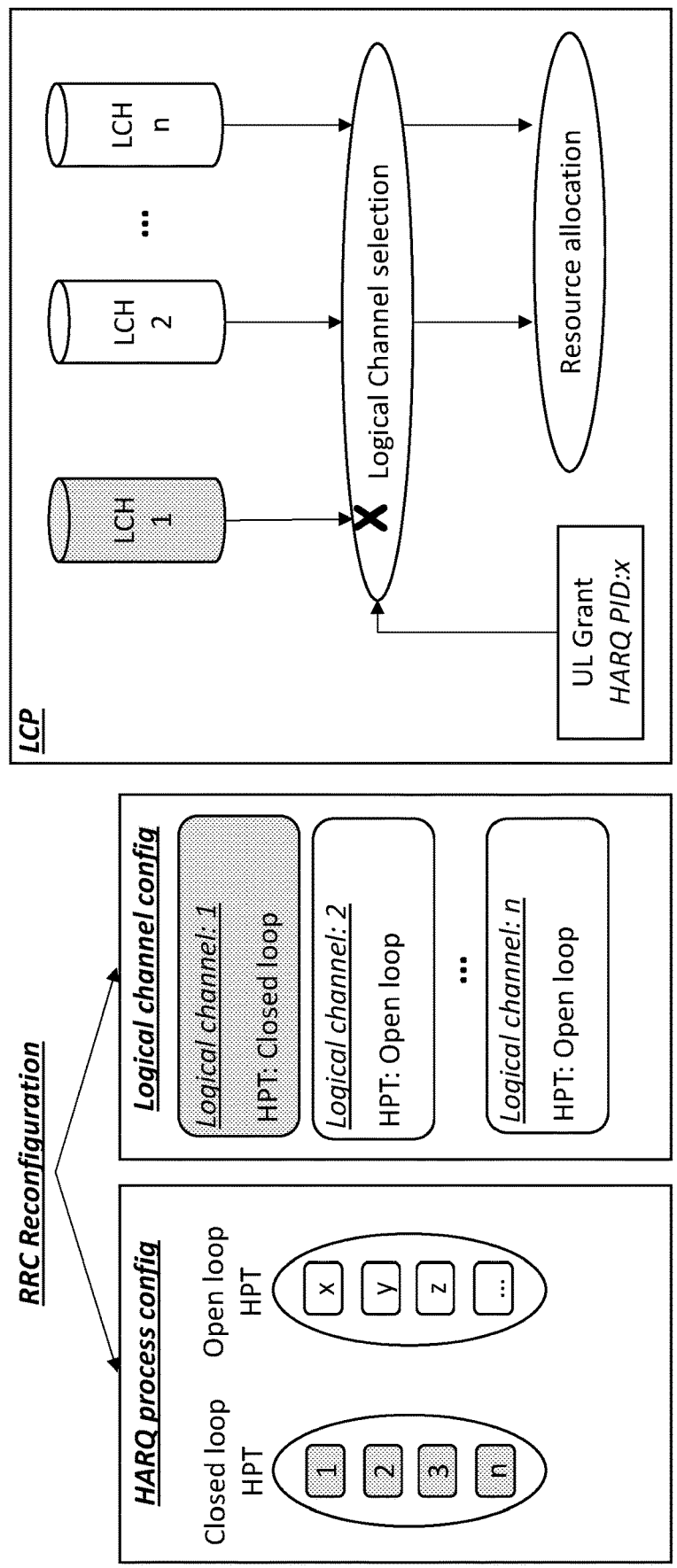
FIG. 5 illustrates an example of associated with logical channel restriction.

FIG. 5 illustrates an example associated with a logical channel restriction/logical channel prioritization.

Systems and methods are described herein for providing logical channel prioritization and/or multiplexing, where the logical channel prioritization and/or multiplexing may be based on HARQ processing (e.g., HARQ processing type or HARQ process ID). A WTRU may (e.g., be configured to) select logical channel(s) for UL transmission, for example, based on a HARQ characteristic associated with an UL grant. For example, FIG. 5 shows an UL grant identifying HARQ process ID "x," which is associated with an open loop HARQ process type as illustrated under "HARQ process config." In the example, one or more of logical channels 2 . . . n may be selected for UL transmission (e.g., LCH 1 has been restricted from use because LCH 1 is of a closed loop type as illustrated in "Logical channel config."

A WTRU may be configured with an applicable HARQ characteristic associated with a logical channel. A HARQ characteristic may correspond to an applicable process ID(s) and/or an applicable HARQ process type (e.g., open loop or closed loop). In examples, one or more UL grants may provide various reliability values or various latency values to achieve a given reliability level. One or more UL transmissions (e.g., UL transmission(s) with a priority above a threshold, in a category indicated as having a higher priority than other category(ies), etc.) may be mapped to UL grants that provide better reliability. For example, a logical channel (LCH) associated with signaling radio bearers may be mapped to UL grants with HARQ feedback enabled. A mapping may be an indication of an association, where the indication may be received (e.g., via a signal), preconfigured, etc. A mapping restriction may be an indication of an a selection (e.g., a selection of channel(s) that are allowed for use, a selection of channel(s) that are not allowed for use, etc.), where the indication may be received (e.g., via a signal), preconfigured, etc.

A WTRU may be configured with an LCH mapping restriction associated with a type of HARQ processing (e.g., as illustrated in FIG. 5, where LCH 1 is restricted from use based on the HARQ process ID indicated in the UL grant and its associated HARQ process type, and, LCH 2 . . . n are allowed for use based on the HARQ process ID indicated in the UL grant and its associated HARQ process type). For example, data available for transmission for a first set of LCH(s) may be multiplexed to a transport block corresponding to HARQ process(es) of a first type of HARQ processing, and data available for transmission for a second set of LCH(s) may be multiplexed based on a second set of HARQ process(es) of a second type of HARQ processing.

A WTRU may perform logical channel prioritization (LCP), for example, based on a (e.g., (pre)configured) mapping restriction between a logical channel and allowed HARQ process type(s) for the logical channel (e.g., the mapping restriction is a selection of logical channel(s) associated with allowed HARQ process type(s)). For example, a WTRU may perform LCP based on a (e.g., (pre)configured) mapping restriction between a logical channel and allowed HARQ process ID(s) for the logical channel (e.g., as illustrated in FIG. 5, where LCH 1 is restricted from use for a transmission based on LCH 1 being associated with a closed loop HARQ processing type, which is not allowed, e.g., not associated with the indicated HARQ process ID, and/or LCH 2 and LCH n are allowed for use for a transmission based on LCH 2 and LCH n being associated with an open loop HARQ processing type, which is allowed). A WTRU may transmit UL MAC SDUs from a logical channel using the UL grant including the HARQ process ID(s) and/or applicable HARQ process type configured for the logical channel (e.g., the allowed LCH(s) resulting from the mapping restriction). A WTRU may skip a logical channel, for example, if its configured HARQ characteristic doesn't match a HARQ characteristic of a UL grant (e.g., as illustrated in FIG. 5, where LCH 1 is skipped, e.g., restricted from use, based on the HARQ processing type not matching a HARQ processing type associated with the HARQ process ID indicated in the UL grant). A WTRU may apply a lower priority for a logical channel whose HARQ characteristic doesn't match a HARQ characteristic of a UL grant, for example, compared to a priority for a logical channel whose HARQ characteristic matches a HARQ characteristic of a UL grant. A WTRU may assume (e.g., based on a configuration) that a logical channel may be mapped to any UL grant irrespective of the applicable HARQ characteristic, for example, if the logical channel is not configured with an applicable HARQ characteristic.

A WTRU may be configured with a service request (SR) configuration for (e.g., common to) an LCH configured with a mapping restriction that may correspond to a (e.g., common) type of HARQ processing. In examples, a WTRU may perform transmission of an SR (e.g., on a physical uplink control channel (PUCCH), or on a physical random access channel (PRACH)) using a first set of resources, for example, if new data becomes available for transmission for an LCH with a mapping restriction to a first type of HARQ processing. The WTRU may perform transmission of an SR using a second set of resources, for example, otherwise.

A WTRU may perform LCP accounting, for example, for the time data is stored in a buffer. In examples, a WTRU may perform LCP based on age of data ($\Delta T$) in a logical channel. The age of data may measure the time for which the data is stored in a buffer. The age of data may be determined, for example, based on the arrival time of the data in the buffer. A WTRU may consider the $\Delta T$ of a (e.g., each) logical channel, for example, if the WTRU selects the logical channel to fulfill a configured resource. In examples, a WTRU may perform LCP, for example, by selecting the logical channel based on the time data has been stored in the buffer and the priority of the data (e.g., in combination with a token bucket Bj value for the logical channel). For example, a function $f(\Delta T, priority)$ may be defined and used to select a logical channel. The function $f(\Delta T, priority)$ may be calculated, for example, based on the value of $\Delta T$ and the priority of the logical channels. The function $f(\Delta T, priority)$ may be dependent on the Bj value for the logical channel (e.g., the current number of available tokens in a token bucket scheme). In examples associated with the function f, the WTRU may be configured to select the logical channels belonging to the highest priority. Among these selected logical channels, the WTRU may be configured to serve the logical channels based on decreasing order of $\Delta T$. The process may continue to the next priority until the logical channels (e.g., all the logical channels) are served or the UL resources (e.g., all the UL resources) in the grant are used up, e.g., whichever is earlier. In examples associated with the function f, the WTRU may be configured to select the logical channel(s) whose $\Delta T$ value is above a threshold. Among these selected logical channels, the WTRU may be configured to serve the logical channels based on their priority level (e.g., highest to lowest) The process may continue in the order of decreasing $\Delta T$ first and decreasing priority second. This may continue until the logical channels (e.g., all the logical channels) are served or the UL resources (e.g., all the UL resources) in the grant are used up, e.g., whichever is earlier.

MAC Control Element (MAC CE) multiplexing may be performed, for example, as a function of HARQ processing. A WTRU may (e.g., be configured to) select one or more MAC CE(s) for transmission, for example, based on a HARQ characteristic associated with a UL grant. A WTRU may (e.g., be configured to) multiplex a MAC CE to a MAC PDU, for example, if the HARQ characteristic associated with a UL grant matches with a HARQ characteristic (e.g., preconfigured) for the MAC CE. A HARQ characteristic may correspond to applicable process ID(s) and/or to applicable HARQ process type(s). In examples, a (e.g., each) MAC CE may be configured with an (e.g., a single) applicable HARQ characteristic. In an (e.g., additional and/or alternative) example, a HARQ characteristic may be configured per MAC CE type. MAC CE(s) (e.g., critical MAC CE(s)) may be mapped to UL grants that provide better reliability, for example, if multiple UL grants provide different reliability or different latency to achieve a given reliability. In examples, a failure in MAC CE transmission may not be recovered via higher layer retransmission (e.g., an RLC layer retransmission). MAC CE transmissions may be allowed on UL grants associated with HARQ feedback enabled.

A WTRU may (e.g., be configured to) apply prioritization of logical channels, for example, based on a HARQ characteristic associated with a UL grant. In examples, a WTRU may apply a first prioritization order, for example, if a UL grant indicates (e.g., explicitly or implicitly indicates) that HARQ feedback is enabled. The WTRU may apply a second prioritization order, for example, if a UL grant indicates (e.g., explicitly or implicitly indicates) that HARQ feedback is disabled. In an example of a first prioritization order, a buffer status report (BSR) and power headroom (PHR) MAC CEs may have a lower priority than data from a logical channel (e.g., other than the uplink common control channel (UL-CCCH)). In an example of a second prioritization order, the BSR and the PHR MAC CEs may have a higher priority than data from logical channel (e.g., other than the UL-CCCH).

Systems and methods are described for overriding a HARQ restriction. A WTRU may (e.g., be configured to) start a timer, for example, if a MAC CE is triggered. A WTRU may reset a timer, for example, if the MAC CE is successfully transmitted. A WTRU may (e.g., while a timer is running) transmit the MAC CE, for example, if the UL grant matches the HARQ characteristic preconfigured for the MAC CE. A WTRU may override a HARQ characteristic configuration and transmit the MAC CE at the earliest available UL grant, for example, if the MAC CE cannot be transmitted before the expiry of the timer.

A WTRU may skip a HARQ feedback transmission, for example, if a received DL transport block is associated with an open loop HARQ process type. A WTRU may (e.g., be configured to) override a rule (e.g., a rule such as skipping a HARQ feedback transmission if a received DL transport block is associated with an open loop HARQ process type), for example, based on the content of a MAC PDU. A WTRU may override a HARQ process type configuration and transmit a HARQ feedback, for example, if the WTRU determines that a DL MAC PDU includes a MAC CE.

A WTRU may (e.g., be configured to) multiplex a first set of MAC CEs to a transport block corresponding to HARQ process(es) of a first type of HARQ processing. Other set(s) of MAC CEs may be multiplexed to a transport block corresponding to a second set of HARQ process(es). In examples, the set of MAC CEs may be a function of the type of MAC CEs (e.g., BSR, PHR).

UL power control may be based on HARQ processing. In examples, a WTRU may (e.g., be configured to) associate one or more parameters and/or a table for power control to a set of HARQ process ID(s) and/or applicable HARQ process type. Examples of the parameters and/or the table may include one or more of the following: (a) a power offset, which may add/lower the resulting power level for a transmission; (b) a fractional power value, which may be used for a fractional pathloss compensation; (c) a transmit power command (TPC) command mapping table, which may map a TPC command field in a DCI to an absolute and/or accumulative power adjustment; (d) a target power Po value and/or adjustment for the power setting for the transmission.

A WTRU may be configured with a power offset value (e.g., that may be) associated with a HARQ process type that may require a HARQ retransmission. The WTRU may be configured with another power offset value that may be associated with other HARQ process type that may not require HARQ retransmission.

A WTRU may be configured with a TPC command mapping table that may be associated with a HARQ process type that may not require HARQ retransmission. The WTRU may be configured with another TPC command mapping table that may be associated with a HARQ process type that may require HARQ retransmission.

A WTRU may (e.g., be configured to) associate a TPC command mapping table with a HARQ process type (e.g., in a one-to-one relationship). A WTRU may be (e.g., further) configured to perform an operation (e.g., add or multiply using a parameter a) with the absolute and/or accumulative power adjustment values as a function of on HARQ process type. For example the WTRU may be configured to apply a first operation (e.g. add or multiply) using a first parameter (e.g. $\alpha 1$) for absolute and/or accumulative power adjustment values associated with a first HARQ process type (e.g., HARQ process type requires HARQ retransmission) and apply a second operation (e.g. add or multiply) using a second parameter (e.g. $\alpha 2$) for absolute and/or accumulative power adjustment values associated with a second HARQ process type (e.g., HARQ process type does not require HARQ retransmission).

A WTRU may (e.g., be configured to) override one or more TPC codepoints in a TPC command mapping table, for example, to have different meanings for the overridden codepoints. In examples, a WTRU may (e.g., be configured to) override a TPC codepoint in the TPC command mapping table, for example, to indicate that the TPC codepoint in the TPC command is for absolute "Pcmax."

A WTRU may (e.g., be configured to) use a modulation and coding scheme (MCS) table for a type of HARQ process. In examples, a WTRU may be configured with a table with a low block error rate (BLER) target. An MCS table (e.g., configured with a table with a low BLER target) may be used, for example, for a HARQ process type that may not require HARQ retransmission. In examples, a WTRU may be configured with a table with a high(er) BLER target. An MCS table (e.g., configured with a table with a high(er) BLER target) may be used for a HARQ process type that may require HARQ retransmission.

A WTRU may (e.g., be configured to) associate an MCS table with a TPC command mapping table and/or vice versa. In examples, a WTRU may (e.g., be configured to) use one MCS table at a time. A WTRU may be configured (e.g., based on an active MCS table) to use a corresponding TPC command mapping table, e.g., to interpret TPC commands for power control.

A WTRU may (e.g., be configured to) determine HARQ behavior associated with configured grants, for example, based on a HARQ configuration. In examples, a WTRU may determine HARQ behavior associated with configured grants based on (e.g., implicitly based on), for example, a HARQ configuration for transmissions associated with dynamic grants. A WTRU may apply an open loop HARQ function for transmissions associated with configured grants, for example, if open loop HARQ is configured for dynamic grants. In examples, a WTRU may apply a HARQ function based on, for example, HARQ processes allocated for configured grants and the HARQ behavior (e.g., open/closed/stateless) configured for those HARQ processes.

In an (e.g., additional and/or alternative) example, a WTRU may (e.g., be configured to) apply a differentiated HARQ function for configured grants, for example, as compared to transmissions with a dynamic grant. For example, a WTRU may (e.g., be configured to) apply a HARQ behavior for transmissions without a dynamic grant (e.g., a configured grant). HARQ behavior may be configured, for example, via RRC signaling (e.g., in a configuredGrantConfig information element).

A WTRU may (e.g., be configured to) determine the HARQ type associated with A (e.g., each) resource in a configured grant. A WTRU may (e.g., be configured to) determine that a (e.g., each) resource may belong to or may be associated with one or more HARQ types (e.g., stateless HARQ, open-loop HARQ, and/or closed loop HARQ).

The HARQ type associated with each resource may be determined, for example, based on one or more of the following parameters: number of HARQ processes assigned to the configured grant; periodicity of the configured grant; time gap between two consecutive HARQ processes; and/or HARQ reuse time (e.g., the minimum time for the WTRU to reuse the same HARQ process). A WTRU may (e.g., thereby) selectively buffer a transmission packet for possible HARQ retransmission, e.g., without sacrificing the data rate.

In an (e.g., additional and/or alternative) example, a WTRU may (e.g., be configured to) use stateless HARQ transmission for the resource in a configured grant. In examples, a WTRU may (e.g., be configured to) use a stateless HARQ transmission for a resource in a configured grant, for example, if one or more (e.g., each) of the HARQ processes assigned to the resource in the configured grant are in use.

Figure 6:
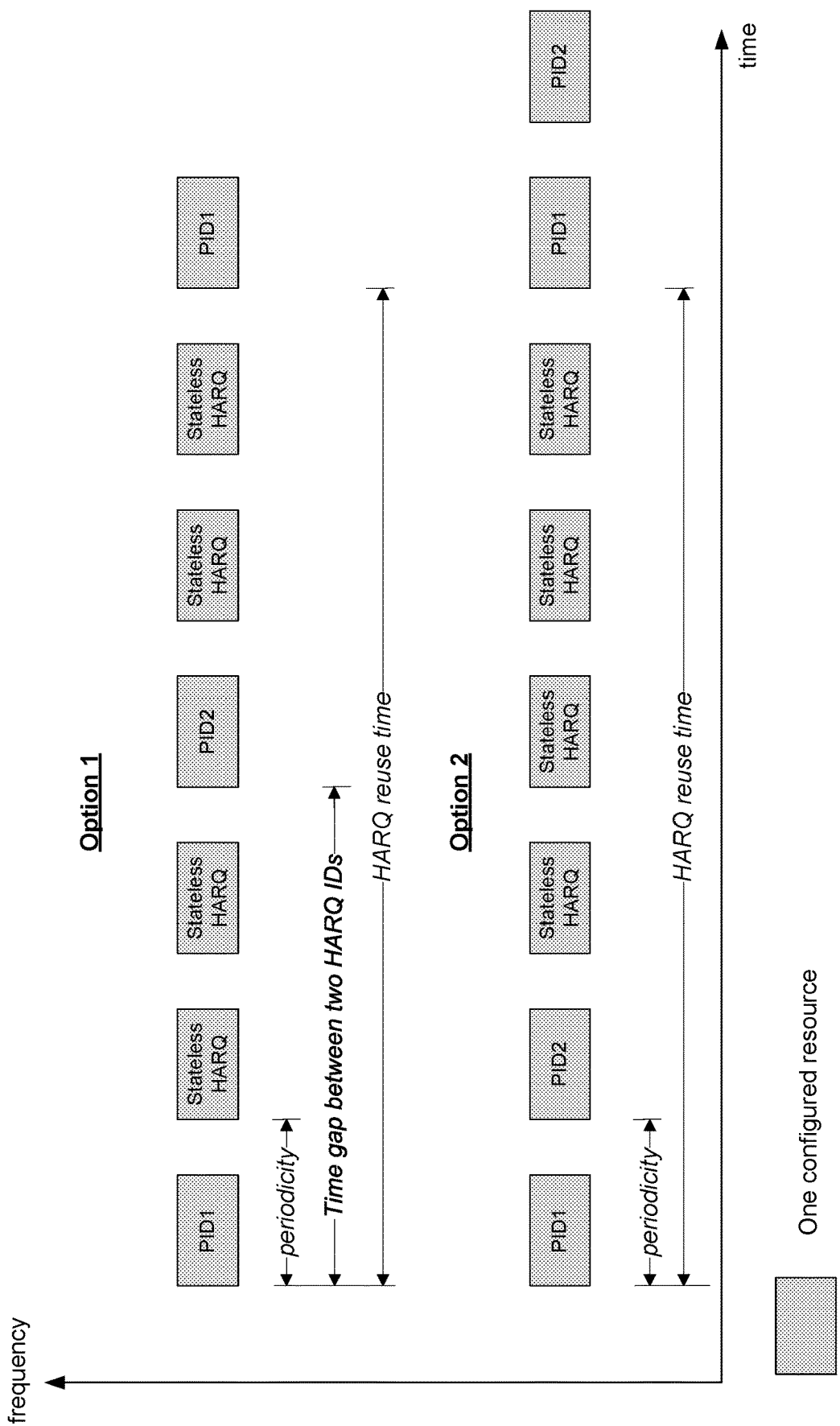
FIG. 6 illustrates examples of a WTRU determining the HARQ type for resources of a configured grant.

FIG. 6 illustrates examples of a WTRU determining the HARQ type for each resource in a configured grant. As illustrated by example in FIG. 6, a WTRU may have two HARQ processes (e.g., identified by PID1 and PID2) assigned to a configured grant. In examples (e.g., as shown in Option 1), a time gap of 2* periodicity may be configured for two consecutive HARQ processes (e.g., PID1 and PID2). In an (e.g., additional and/or alternative) example (e.g., as shown in Option 2), no time gap between two consecutive HARQ processes (e.g., PID1 and PID2) may be configured. In examples (e.g., as shown in Option 1 and Option 2), a WTRU may (e.g., based on the configuration) determine the HARQ type associated with a (e.g., each) resource in the configured grant.

Although the solutions provided herein may describe examples with references to LTE, LTE-A, New Radio (NR) or 5G specific protocols and may be described using a non-terrestrial network, it is understood that the solutions described herein are not restricted to those scenarios and may be applicable to other wireless systems, deployments, or networks as well. Solutions discussed herein may be applicable at least to network deployments with similar characteristics, for example, in terms of long latency, round trip time delays, and/or network components (e.g., gNB) not being fixed (e.g., satellites, aerials, etc.).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A wireless transmit/receive unit (WTRU) comprising:
a processor, configured to:
receive an indication of an association between a first hybrid automatic repeat request (HARQ) process identifier (ID) and a first HARQ processing type and between a second HARQ process ID and a second HARQ processing type;
receive an indication of an association between a first logical channel and the first HARQ processing type and between a second logical channel and the second HARQ processing type;
receive an uplink (UL) grant that indicates a HARQ process ID;
determine a HARQ processing type associated with the HARQ process ID, wherein the determined HARQ processing type is the first HARQ processing type or the second HARQ processing type;
on a condition that the HARQ processing type is determined to be the first HARQ processing type, select the first logical channel to use for a transmission associated with the UL grant;
on a condition that the HARQ processing type is determined to be the second HARQ processing type, select the second logical channel to use for the transmission associated with the UL grant; and
send the transmission using the UL grant.

2. The WTRU of claim 1, wherein for the determination of the logical channel available for use:
if the HARQ process ID is associated with the first HARQ processing type, the first logical channel is determined to be available for use for the transmission, and
if the HARQ process ID is associated with the second HARQ processing type, the second logical channel is determined to be available for use for the transmission.

3. The WTRU of claim 1, wherein the transmission is a scheduling request (SR), and wherein the processor is further configured to send the SR on the logical channel available for use.

4. The WTRU of claim 1, wherein the transmission is sent using the logical channel available for use.

5. The WTRU of claim 1, wherein the first HARQ processing type is associated with a first power parameter and the second HARQ processing type is associated with a second power parameter.

6. The WTRU of claim 5, wherein the processor is further configured to send the transmission using the logical channel available for use, wherein the transmission is associated with a power parameter, wherein the power parameter is the first power parameter or the second power parameter, wherein the first power parameter is a first power offset, a first fractional power value, a first transmit power command (TPC) command, or a first target power, and wherein the second power parameter is a second power offset, a second fractional power value, a second TPC command, or a second target power.

7. A method associated with hybrid automatic request (HARQ) processing, the method comprising:
   receiving an indication of an association between a first hybrid automatic repeat request (HARQ) process identifier (ID) and a first HARQ processing type and between a second HARQ process ID and a second HARQ processing type;
   receiving an indication of an association between a first logical channel and the first HARQ processing type and between a second logical channel and the second HARQ processing type;
   receiving an uplink (UL) grant that indicates a HARQ process ID;
   determining a HARQ processing type associated with the HARQ process ID, wherein the determined HARQ processing type is the first HARQ processing type or the second HARQ processing type;
   on a condition that the HARQ processing type is determined to be the first HARQ processing type, selecting the first logical channel to use for a transmission associated with the UL grant;
   on a condition that the HARQ processing type is determined to be the second HARQ processing type, selecting the second logical channel to use for the transmission associated with the UL grant; and
   sending the transmission using the UL grant.

8. The method of claim 7, wherein for the determination of the logical channel available for use:
   if the HARQ process ID is associated with the first HARQ processing type, the first logical channel is determined to be available for use for the transmission, and
   if the HARQ process ID is associated with the second HARQ processing type, the second logical channel is determined to be available for use for the transmission.

9. The method of claim 7, wherein the transmission is a scheduling request (SR), and wherein the method further comprises sending the SR on the logical channel available for use.

10. The method of claim 7, wherein the transmission is sent using the logical channel available for use.

11. The method of claim 7, wherein the first HARQ processing type is associated with a first power parameter and the second HARQ processing type is associated with a second power parameter.

12. The method of claim 11, further comprising:
   sending the transmission using the logical channel available for use, wherein the transmission is associated with a power parameter, wherein the power parameter is the first power parameter or the second power parameter, wherein the first power parameter is a first power offset, a first fractional power value, a first transmit power command (TPC) command, or a first target power, and wherein the second power parameter is a second power offset, a second fractional power value, a second TPC command, or a second target power.

* * * * *